(12) United States Patent
Pekonen et al.

(10) Patent No.: US 7,460,869 B2
(45) Date of Patent: Dec. 2, 2008

(54) ADAPTIVE HANDOVER MEASUREMENT INTERVAL

(75) Inventors: Harri J Pekonen, Raisio (FI); Jussi Vesma, Turku (FI)

(73) Assignee: Nokia Corporation, Espoo (FI)

( * ) Notice: Subject to any disclaimer, the term of this patent is extended or adjusted under 35 U.S.C. 154(b) by 632 days.

(21) Appl. No.: 11/132,372

(22) Filed: May 19, 2005

(65) Prior Publication Data

US 2006/0205406 A1 Sep. 14, 2006

Related U.S. Application Data

(60) Provisional application No. 60/661,038, filed on Mar. 14, 2005.

(51) Int. Cl.
*H04Q 7/20* (2006.01)
*H04L 5/22* (2006.01)

(52) U.S. Cl. .................. 455/436; 455/441; 455/443

(58) Field of Classification Search ......... 455/436–441, 455/434, 515, 574, 67.11, 455; 370/331, 370/332

See application file for complete search history.

(56) References Cited

U.S. PATENT DOCUMENTS

| | | | |
|---|---|---|---|
| 6,292,660 B1 | 9/2001 | Hartless | |
| 6,385,460 B1 | 5/2002 | Wan | |
| 6,640,102 B2 * | 10/2003 | Frodigh et al. | 455/436 |
| 7,065,375 B2 * | 6/2006 | Bonhomme | 455/506 |
| 2004/0180650 A1 * | 9/2004 | Kamemura et al. | 455/422.1 |

FOREIGN PATENT DOCUMENTS

| | | |
|---|---|---|
| GB | 2358550 | 7/2006 |
| WO | 0076233 | 12/2000 |

OTHER PUBLICATIONS

Article found at: http://www.eurasip.org/content/Eusipco/IST05/papers/272.pdf X.D. Yang, et al., "An Investigation of and a Proposal for Handover Decision-maiking in DVB-H", 14th IST Mobile & Wireless Communication Summit, Dresden, Jun. 19-23, 2005.

* cited by examiner

*Primary Examiner*—Melur Ramakrishnaiah
(74) *Attorney, Agent, or Firm*—Banner & Witcoff, Ltd.

(57) ABSTRACT

Apparatus and methods are provided for adaptively determining a handover measurement interval. Power savings are achieved when a mobile terminal in a digital broadcast broadband network does not constantly attempt to measure the signal strength of nearby cells. By determining cell parameters, such as size and carrier frequency, and also determining dynamic information, such as signal strength and mobile speed over time, the time until the next handover measurement is adjusted up or down. When a mobile terminal is moving towards a transmitter in a cell, the handover measurement interval may be lengthened, and when a mobile terminal is moving away from a transmitter, the interval may be shortened.

27 Claims, 7 Drawing Sheets

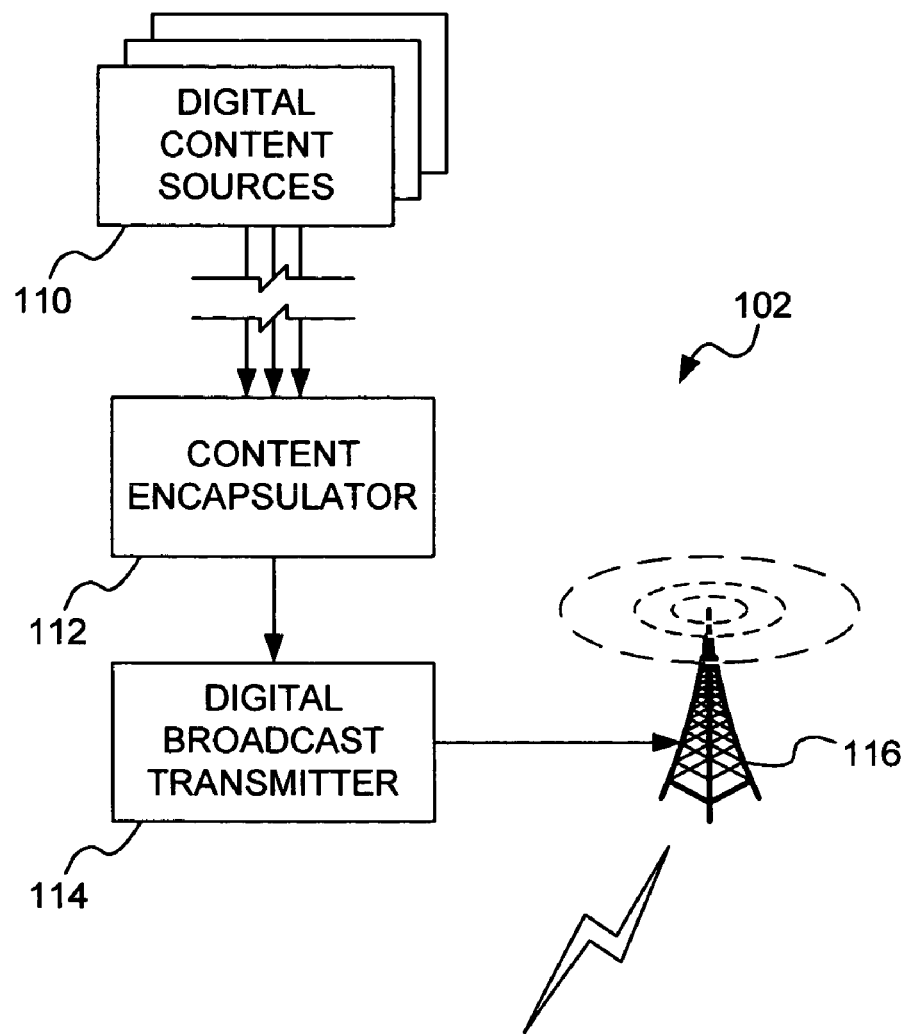
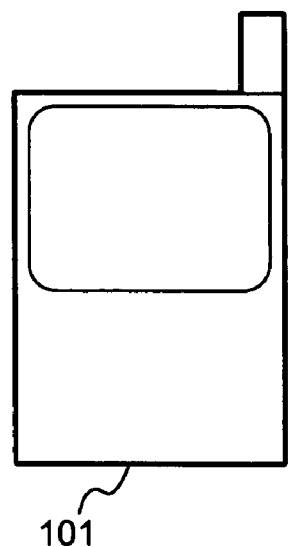
FIG. 1

| Modulation | Code Rate | Bit Rate (Mbit/s) | FFT Mode = 2K | | | | | | FFT Mode = 8K | | | | | | |
|---|---|---|---|---|---|---|---|---|---|---|---|---|---|---|---|
| | | | $C/N_{min}$ (dB) | $F_{dmax}$ (Hz) | $F_{d3dB}$ (Hz) | Speed (km/h) | | | $C/N_{min}$ (dB) | $F_{dmax}$ (Hz) | $F_{d3dB}$ (Hz) | Speed (km/h) | | |
| | | | | | | 474 MHz | 860 MHz | 1672 MHz | | | | 474 MHz | 860 MHz | 1672 MHz |
| QPSK | 1/2 | 6.03 | 13.0 | 318 | 259 | 590 | 325 | 167 | 13.0 | 76 | 65 | 148 | 82 | 42 |
| QPSK | 2/3 | 8.04 | 16.0 | 247 | 224 | 510 | 281 | 145 | 16.0 | 65 | 53 | 121 | 67 | 34 |
| 16-QAM | 1/2 | 12.06 | 18.5 | 224 | 176 | 415 | 229 | 118 | 18.5 | 59 | 47 | 107 | 59 | 30 |
| 16-QAM | 2/3 | 16.09 | 21.5 | 176 | 147 | 335 | 185 | 95 | 21.5 | 41 | 35 | 80 | 44 | 23 |
| 64-QAM | 1/2 | 18.10 | 23.5 | 141 | 118 | 269 | 148 | 76 | 23.5 | 35 | 29 | 66 | 36 | 19 |
| 64-QAM | 2/3 | 24.13 | 27.0 | 82 | 65 | 148 | 82 | 42 | 27.0 | 24 | 18 | 41 | 23 | 12 |

DVB-T Carrier to Noise Ratios, Doppler Spreads, and Maximum Receiver Speed (at $F_{d3dB}$) for Combinations of Modulation, Code Rate, FFT Mode, and Carrier Frequencies
Guard Interval = 1/32

FIG. 6

ADAPTIVE HANDOVER MEASUREMENT INTERVAL

This patent application claims priority to and hereby incorporates by reference U.S. Provisional Application Ser. No. 60/661,038 filed on Mar. 14, 2005.

FIELD OF THE INVENTION

The invention relates to handover procedures in digital broadband broadcast networks. More particularly, the invention provides for adaptive handover measurements of candidate cells.

BACKGROUND OF THE INVENTION

In digital broadband broadcast networks, mobile terminals receiving a broadcast must perform handover operations when moving from one cell to another in order to ensure uninterrupted reception of digital content. Handover decisions for mobile terminals may be made using information about adjacent cells. This information may be derived from multiple sources, including signal quality measurements of handover candidate cell signals.

One conventional approach to making handover measurements is to measure the signal strengths of adjacent cells at regular intervals of time. This may potentially waste processing time and may especially waste valuable power used by a radio in the mobile terminal. For example, a mobile terminal may move very slowly through a cell, or even remain stationary for a long period of time. In this situation, scanning repeatedly for nearby cells would be completely unnecessary and wasteful.

Therefore, there is a need in the art for handover procedures and systems which selectively and sparingly make handover measurements, saving power and processing time within a mobile terminal.

BRIEF SUMMARY OF THE INVENTION

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

A first illustrative embodiment provides a method for determining a handover measurement interval. Based on information about a current cell, such as cell size and carrier frequency, a time interval is determined for the next handover measurement. This interval may be adjusted based on a determined change in signal quality over time and/or based on a determined speed of the receiver.

A second illustrative embodiment provides a mobile terminal including a processor and a receiver. The mobile terminal may receive digital broadcast broadband signals. Based on information about a current cell, the processor determines a handover measurement interval. The processor may be configured to adjust the interval based on changes in signal quality and mobile terminal speed.

A third illustrative embodiment provides one or more integrated circuits with circuitry to perform steps vital to determining a handover measurement interval. The circuitry may track changes in signal quality of a current cell and/or determine a speed of a mobile device within a current cell. The circuitry may utilize Doppler shift information to determine the speed of the mobile device.

BRIEF DESCRIPTION OF THE DRAWINGS

The present invention is illustrated, by way of example and not limitation, in the accompanying figures in which like reference numerals indicate the same or similar elements and in which:

FIG. 1 illustrates a suitable digital broadband broadcast system in which one or more illustrative embodiments of the invention may be implemented;

FIG. 6 is a table of transmission information useful to one or more illustrative embodiments of the invention;

DETAILED DESCRIPTION OF THE INVENTION

Figure 2:
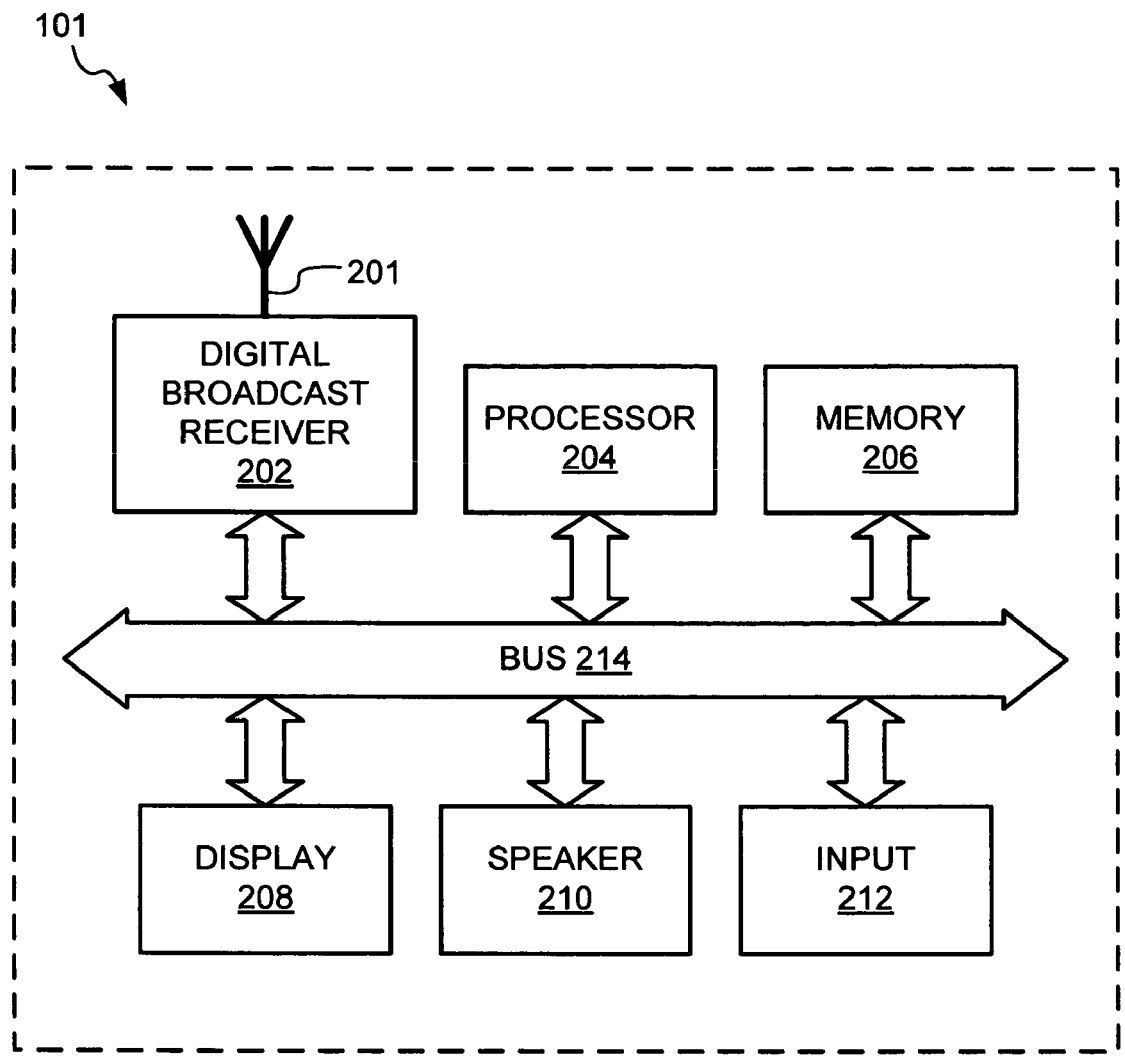
FIG. 2 illustrates a functional block diagram of a mobile terminal in which one or more illustrative embodiments of the invention may be implemented.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Aspects of the invention provide a method and apparatus for determining a handover measurement interval in a digital broadband broadcast network. FIG. 1 illustrates a suitable system within which one or more illustrative embodiments of the invention may be implemented. Digital broadband broadcast system 102 receives digital content provided by content sources 110. The content, whether video, audio, data, or other, may be buffered, reordered and packaged by content encapsulator 112. Digital content then passes to digital broadcast transmitter 114. Along the way, digital content may undergo encoding and interleaving for transmission as high-bandwidth bursts. These bursts are broadcast by transmitter 116, for reception by mobile terminal 101.

Digital broadband broadcast system 102 may use any number of standards to package and transmit digital content. Digital Video Broadcasting-Handheld (DVB-H) is one standard for a digital broadcasting system within which the invention may be implemented. Examples of other digital broadcast standards which may utilize the invention include Digital Video Broadcast-Terrestrial (DVB-T), Integrated Services Digital Broadcasting-Terrestrial (ISDB-T), Advanced Television Systems Committee (ATSC) Data Broadcast Standard, Digital Multimedia Broadcast-Terrestrial (DMB-T), Terrestrial Digital Multimedia Broadcasting (T-DMB), Digital Audio Broadcasting (DAB), and Digital Radio Mondiale (DRM). Other digital broadcasting standards and techniques, now known or later developed, may also be used.

FIG. 2 illustrates a functional block diagram of mobile terminal 101 in which one or more illustrative embodiments of the invention may be implemented. Mobile terminal 101 may include digital broadcast receiver 202, which may include antenna 201. Radio signals transmitted by broadcast system 102 are received by antenna 201 and passed to receiver 202. Receiver 202 may perform a series of transforming, decoding and deinterleaving steps on the received radio signals, ultimately converting the received signals into usable digital content. Digital content may additionally or alternatively be decoded by processor 204. Processor 204 may also enable digital content to be consumed in the form of video for output via one or more displays 208 or audio for output via speaker and/or earphones 210. Digital content may also be stored in memory 206 for future processing or consumption.

Memory 206 may also store channel and program information about digital content available in the future or stored from the past. A user of mobile terminal 101 may view this stored service information on display 208 and select an item of digital content for viewing, listening, or other uses via input 212, which may take the form of a keyboard, keypad, scroll wheel, or other input device(s) or combinations thereof. When digital content is selected, processor 204 may pass information to receiver 202, so that the receiver may act appropriately (e.g., tune a radio or filter signals based on program specific information or service information in order to yield specific digital content for the user). Service information may be encoded within the same digital bursts which deliver other forms of digital content to mobile terminal 101. Digital content may be passed among functions within mobile terminal 101 using bus 214. Although a single bus 214 is portrayed here, functional components may be directly or indirectly connected through other means or connections aside from or in addition to one or more buses. Components within mobile terminal 101 may additionally or alternatively communicate via Universal Serial Bus (USB), Inter-Integrated Circuit (I2C) bus, Serial Peripheral Interface (SPI) bus, or through other communication schemes.

Receiver 202 may include circuitry for receiving a radio frequency signal and for producing a baseband signal. Receiver 202 may also include demodulation circuitry and/or decapsulation circuitry. Receiver 202 may also include, in various embodiments, a processor (e.g., a microcontroller) and/or memory. Receiver 202 may pass information (e.g., IP packets and/or other packets) to processor 204 or memory 206 for further operations (e.g., present program information to a user).

Various methods, operations, and the like described herein may, in various embodiments, be implemented in hardware and/or in software. Hardware may include one or more integrated circuits. For example, in various embodiments, the methods described may be performed by specialized hardware, and/or otherwise may not be implemented in general purpose processors. One or more chips and/or chipsets may be employed, including one or more application-specific integrated circuits (ASICs).

Mobile terminal 101 may include other functional components (not shown) such as a cellular radio or other RF transceiver. Such functionality may be used for audio transmissions when coupled with a microphone (not shown) and speaker 210, as in a wireless phone, for example. Additional communication components (not shown) may be used to request and/or retrieve authorization to view or listen to protected digital content, enabling the enforcement of digital copyrights and pay-for-use regimes. Mobile terminal 101 may also include functionality to detect a location of the terminal, for example a Global Positioning System (GPS) or an Assisted GPS (AGPS). Although one particular functional diagram for mobile terminal 101 is provided, those skilled in the art understand that functionality may be added or removed, but the invention may still be implemented within the mobile terminal.

Figure 3:
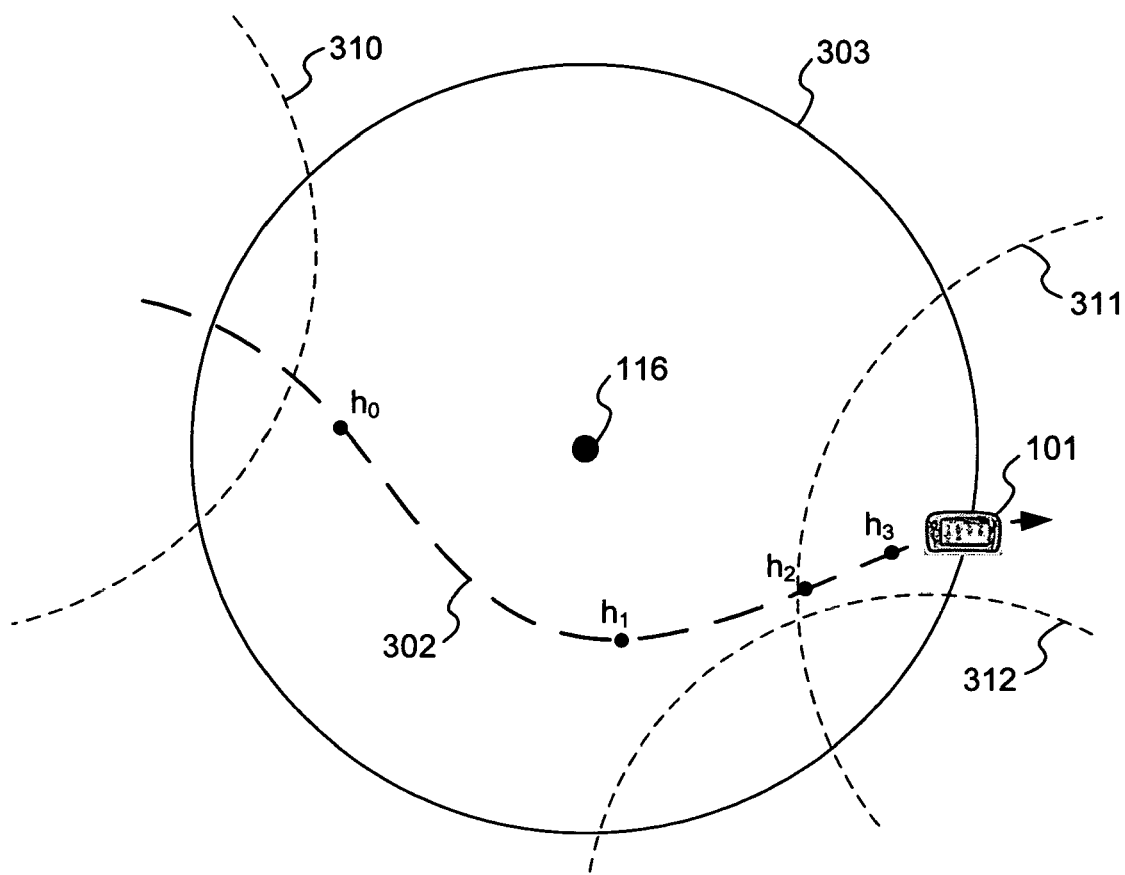
FIG. 3 illustrates a path of a mobile terminal through a current cell according to one or more illustrative embodiments of the invention.

FIG. 3 illustrates a path 302 of a mobile terminal 101 through a current cell 303 according to one or more embodiments of the invention. Here, mobile terminal 101 is receiving digital content and previously performed a handover when transitioning from cell 310 into current cell 303. Mobile terminal 101 continues to receive bursts of data intermittently containing the digital content while traveling through cell 303. At irregular intervals, mobile terminal 101 performs handover measurements $h_0$, $h_1$, $h_2$, and $h_3$, testing the signal quality of nearby cells which may be candidates for a future handover. The locations of $h_0$, $h_1$, $h_2$, and $h_3$ in FIG. 3 are representative only of possible locations in which the respectively measurements might have been taken. In the present example, after likely evaluating signal quality from candidate cells 311 and 312, mobile terminal 101 opts for cell 311 for the next handover.

Handover measurements $h_0$, $h_1$, $h_2$, and $h_3$ may be performed at irregular intervals because mobile terminal 101 may be calculating a handover measurement interval based on cell parameters and changing conditions. There is no need, for example, to perform additional handover measurements when the signal quality of the data delivered by cell transmitter 116 is getting stronger over time. This may occur when mobile terminal 101 is moving towards cell transmitter 116. Other factors which may be used in the calculation of a handover measurement interval are set forth in more detail below.

As an example, if mobile terminal 101 moves toward an edge of or out of cell 303, handover measurements may be performed more frequently in anticipation of a forthcoming handover. As mobile terminal 101 measures the signal quality of nearby cells, a list of candidate cells may be stored, and sliding averages of signal strength for each computed, updating with each new measurement. Mobile terminal 101 may use such a list of candidate cells a factor in deciding which of the handover candidates it should use. Mobile terminal 101 may opt to handover to the candidate cell with the highest sliding average of signal strength.

Figure 4:
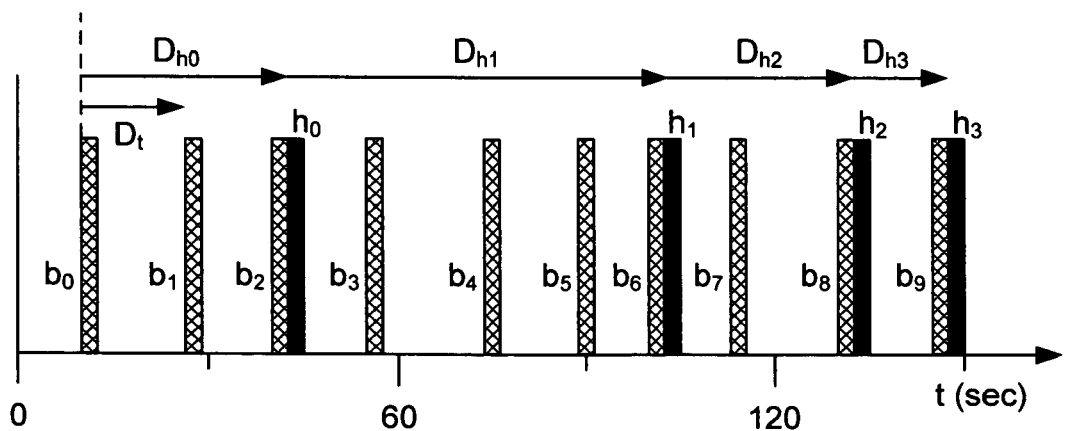
FIG. 4 is a graph depicting radio usage over time when receiving broadcast signals and measuring handover candidates according to one or more illustrative embodiments of the invention.

FIG. 4 is a graph depicting radio usage over time when receiving broadcast signals and measuring handover candidates according to one or more embodiments of the invention. Mobile terminal 101 may be receiving digital broadband broadcast bursts $b_0$, $b_1$ ... $b_9$ while traveling through cell 303. These bursts may arrive at irregular intervals. The interval may be provided in a header associated with a previous burst. For example, $D_t$ in FIG. 4 (about 16 seconds) may have been provided in a header of first burst $b_0$. Mobile terminal 101 determines a first handover measurement interval $D_{h0}$ either before or upon arrival of the mobile terminal 101 in cell 303. First handover measurement interval $D_{h0}$ may be determined through calculations performed by mobile terminal 101, or may be provided to mobile terminal via program specific information and service information (PSI/SI) tables delivered as part of a burst. Subsequent handover measurement intervals $D_{h1}$, $D_{h2}$, and $D_{h3}$ may be calculated by mobile terminal 101 based on changing conditions over time, as described below.

When mobile terminal 101 first performs a handover into cell 303, it may use a static handover measurement interval component $h_s$ without calculating a dynamic component $h_d$. Alternatively, mobile terminal 101 may immediately calculate a dynamic component $h_d$ and use it to adjust the static component $h_s$. Subsequent dynamic component calculations may further adjust the measurement interval.

Handover measurement intervals may be calculated or adjusted so as to coincide with burst receptions as shown in FIG. 4. Here, for example, handover measurement $h_0$ is coupled with burst $b_2$. This may allow the digital broadcast receiver in mobile terminal 101 to remain powered up while performing measurements and save power by not powering down and powering up again unnecessarily to perform an unnecessary handover measurement. Handover measurements may be timed to occur immediately before or immediately after a scheduled burst. If needed, however, handover measurements may also be scheduled to occur at other times not coinciding with bursts.

Figure 5A:
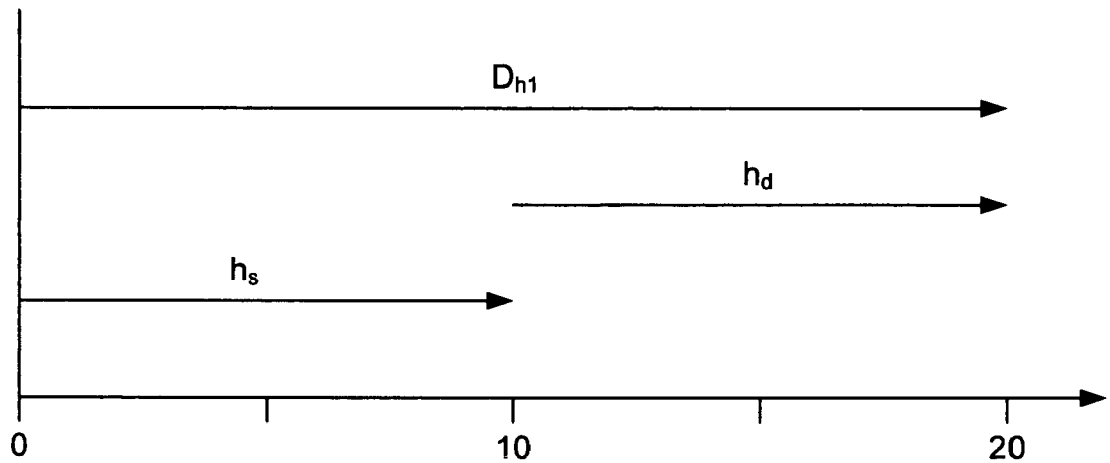
FIGS. 5A and 5B depict handover measurement interval calculations according to one or more illustrative embodiments of the invention.
Figure 5B:
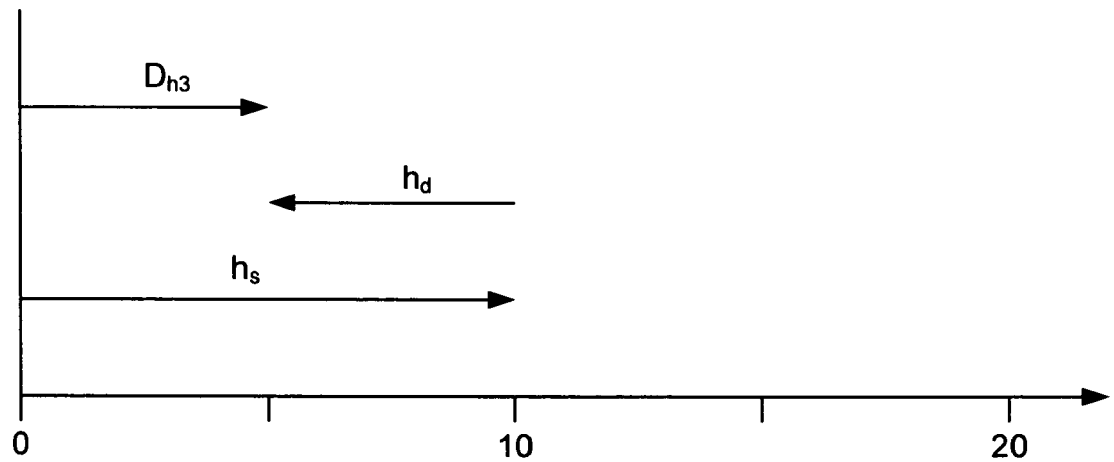

FIGS. 5A and 5B depict the calculation of handover measurement intervals $D_{h1}$ and $D_{h3}$, respectively, according to one or more illustrative aspects of the invention. Calculating a handover measurement interval may involve determining a static component $h_s$ and a dynamic component $h_d$. Summing the intervals provided by each component yields handover measurement interval $D_{h1}$. In FIG. 5A, dynamic handover measurement interval $h_d$ is added to static component $h_s$, lengthening the overall handover measurement interval $D_{h1}$, and extending the amount of time until the next handover measurement is made. The interval may be lengthened when changing conditions indicate a longer period of time before a handover may be needed. In FIG. 5B, dynamic handover measurement interval $h_d$ is subtracted from static component $h_s$, shortening handover measurement $D_{h3}$. Alternatively, $h_d$ may be a negative value, allowing the two components to be added together, regardless of outcome. The interval may be shortened when changing conditions indicate that a handover may be imminent and updated signal quality measurements for handover candidates are needed.

Determining static handover measurement interval component $h_s$ may involve determining those aspects of a handover measurement which remain constant regardless of location within a given cell. These aspects, or cell parameters, may include cell size, maximum tolerated speed, carrier frequency, network mode, and so forth. These aspects may be interrelated, where changes in one, such as carrier frequency affect the values of others, such as maximum tolerated speed. Alternatively, static handover measurement interval component $h_s$ may be provided to mobile terminal 101 via PSI/SI tables included in a burst. Such pre-calculated static interval components for nearby cells may be provided prior to making a handover decision and stored by mobile terminal 101. Once a handover decision is made, some or all of the pre-calculated static handover measurement interval components may be discarded, and the new static component implemented.

Individual parameters affecting a static component, such as cell size, may be detected or calculated by mobile terminal 101, or provided via PSI/SI. Cell size in particular may be determined based on information passed in a signaling table. For example, a cell list descriptor table, as defined under DVB standards (ETSI EN 300 468 Digital Video Broadcasting (DVB); Specification for Service Information (SI) in DVB systems), may provide extent of longitude and extent of latitude information from which an actual cell size can be derived. Table 1 below describes a cell list descriptor table as provided by the DVB standards.

TABLE 1

Cell List Descriptor

| Syntax | No. of bits | Identifier |
|---|---|---|
| cell_list_descriptor( ) { | | |
|   descriptor_tag | 8 | uimsbf |
|   descriptor_length | 8 | uimsbf |
|   for (i=0;i<N;i++){ | | |
|     cell_id | 16 | uimsbf |
|     cell_latitude | 16 | uimsbf |
|     cell_longitude | 16 | uimsbf |
|     cell_extent_of_latitude | 12 | uimsbf |
|     cell_extent_of_longitude | 12 | uimsbf |
|     subcell_info_loop_length | 8 | uimsbf |
|     for(j=0;j<N;j++){ | | |
|       cell_id_extension | 8 | uimsbf |
|       subcell_latitude | 16 | uimsbf |
|       subcell_longitude | 16 | uimsbf |
|       subcell_extent_of_latitude | 12 | uimsbf |
|       subcell_extent_of_longitude | 12 | uimsbf |
|     } | | |
|   } | | |
| } | | |

If mobile terminal 101 does not receive cell size information from the network, however, the terminal may be able to determine the maximum size of a cell based on the network mode of the signal presently being received. For example, in a Single Frequency Network (SFN), echoes must arrive at a receiver within the guard interval period in order to be constructive and not destructive. If an echo arrives after the guard interval, the echo level should be below the carrier-to-noise ratio for a simple DVB-H receiver, for example. Table 2 below provides maximum cell diameters in kilometers based on the Fast Fourier Transform (FFT) Mode and the guard interval.

TABLE 2

Maximum Possible SFN Area Sizes

| FFT Mode | Guard Interval | GI (microseconds) | SFN Site Diameter (km) |
|---|---|---|---|
| 8 K | ¼ | 219 | 65.7 |
| | ⅛ | 107 | 32.1 |
| | 1/16 | 51 | 15.3 |
| | 1/32 | 23 | 6.9 |
| 2 K | ¼ | 51 | 15.3 |
| | ⅛ | 23 | 6.9 |
| | 1/16 | 9 | 2.7 |
| | 1/32 | 2 | 0.6 |
| 4 K | ¼ | 107 | 32.1 |
| | ⅛ | 51 | 15.3 |
| | 1/16 | 23 | 6.9 |
| | 1/32 | 9 | 2.7 |

Cell parameters which may affect the static handover measurement interval component $h_s$ may also include the effect of the selected carrier frequency on the maximum tolerated speed. Carrier frequencies for digital broadband broadcast networks vary widely. DVB-H networks frequencies, for example, may range from 474 MHz to 1672 MHz. Because of the Doppler Effect, signals received by moving mobile terminals may be distorted beyond use. This means that receivers may have a maximum speed that is limited by the carrier frequency's inability to overcome the Doppler Effect. Lower carrier frequencies overcome this effect at higher receiver speeds. In DVB-H networks, for example, the maximum tolerated speed with a 474 MHz carrier frequency is 3.3 times higher than with a 1672 MHz carrier.

Furthermore, the network mode and other cell parameters may further affect the maximum tolerated speed of a receiver within a cell. FIG. 6 is a table of transmission information useful to one or more embodiments of the invention. Assuming a constant guard interval, for various modulation schemes, code rates, and FFT modes, the table provides the minimum carrier-to-noise ratio, Doppler spreads, and receiver speed (based on carrier frequency). From the table, it can be seen that given a constant guard interval (1/32), the highest maximum speeds are attainable in a cell using QPSK modulation with a code rate of 1/2, and a carrier frequency of 474 MHz. The trade-off is that the data throughput of such a system is lower. The lowest maximum speeds (and highest throughput) are present in a cell using 64-QAM modulation with a code rate of 2/3, and a carrier frequency of 1672 MHz. Based on this information, a mobile terminal may be able to determine its maximum tolerated speed. Having a maximum tolerated speed and an estimated cell size may permit mobile terminal 101 at a minimum to compute an upper bound for the static handover measurement interval component $h_s$.

Dynamic handover measurement interval component $h_d$ may be determined more than once per cell, as opposed to the static component $h_s$. The dynamic component may be used to adjust the static component up or down depending on changing conditions of the mobile terminal. Variables which may affect the dynamic component include signal quality, mobile terminal speed, and mobile terminal direction. These variables may be determined every $D_t$ seconds when a new burst is received, or more often. A new dynamic handover measurement interval $h_d$ may also be determined every $D_t$ seconds. Alternatively, $h_d$ may be calculated each time a new handover measurement is performed. These variables may be averaged over a fixed period of time, or a moving average or rate of change may be calculated and used in determining $h_d$.

A mobile terminal 101 receiving a digital broadband broadcast signal may measure signal quality in any number of ways. For example, mobile terminal 101 may measure the radio signal strength indicator (RSSI) of the signal emitted from transmitter 116. Additionally, once a digital stream is derived from the signal, mobile terminal 101 may evaluate the bit error ratio (BER) and/or packet error ratio (PER) of the digital stream. As mobile terminal 101 moves closer to cell transmitter 116, the measured RSSI value typically increases. Likewise the number of transmission errors in the form of bit and packet errors typically decreases. When an increase in signal strength and/or decrease in errors is detected, dynamic handover measurement interval $h_d$ may be lengthened since mobile terminal 101 is assumed to be traveling towards transmitter 116 and a handover likely won't be necessary in the near future. When measured RSSI decreases and/or error ratios increase, the dynamic handover measurement interval $h_d$ may be shortened or made negative since mobile terminal 101 is assumed to be traveling away from transmitter 116.

A mobile terminal 101 receiving a digital broadband broadcast signal may measure mobile speed in any number of ways. For example, mobile terminal 101 may measure the Doppler spread of the carrier frequency to determine speed towards or away from transmitter 116. Inter-carrier interference (ICI) cancellation algorithms are used in some receivers to compensate for the Doppler spread effect caused by receiver movement and may be modified to provide Doppler spread for use in calculating dynamic handover measurement interval hd. Additionally, an estimation of the coherence time of the channel may be used in estimating mobile speed. If mobile terminal 101 includes a positioning system such as GPS or AGPS, mobile speed and direction may be determined by comparing positions over time.

Figure 7:
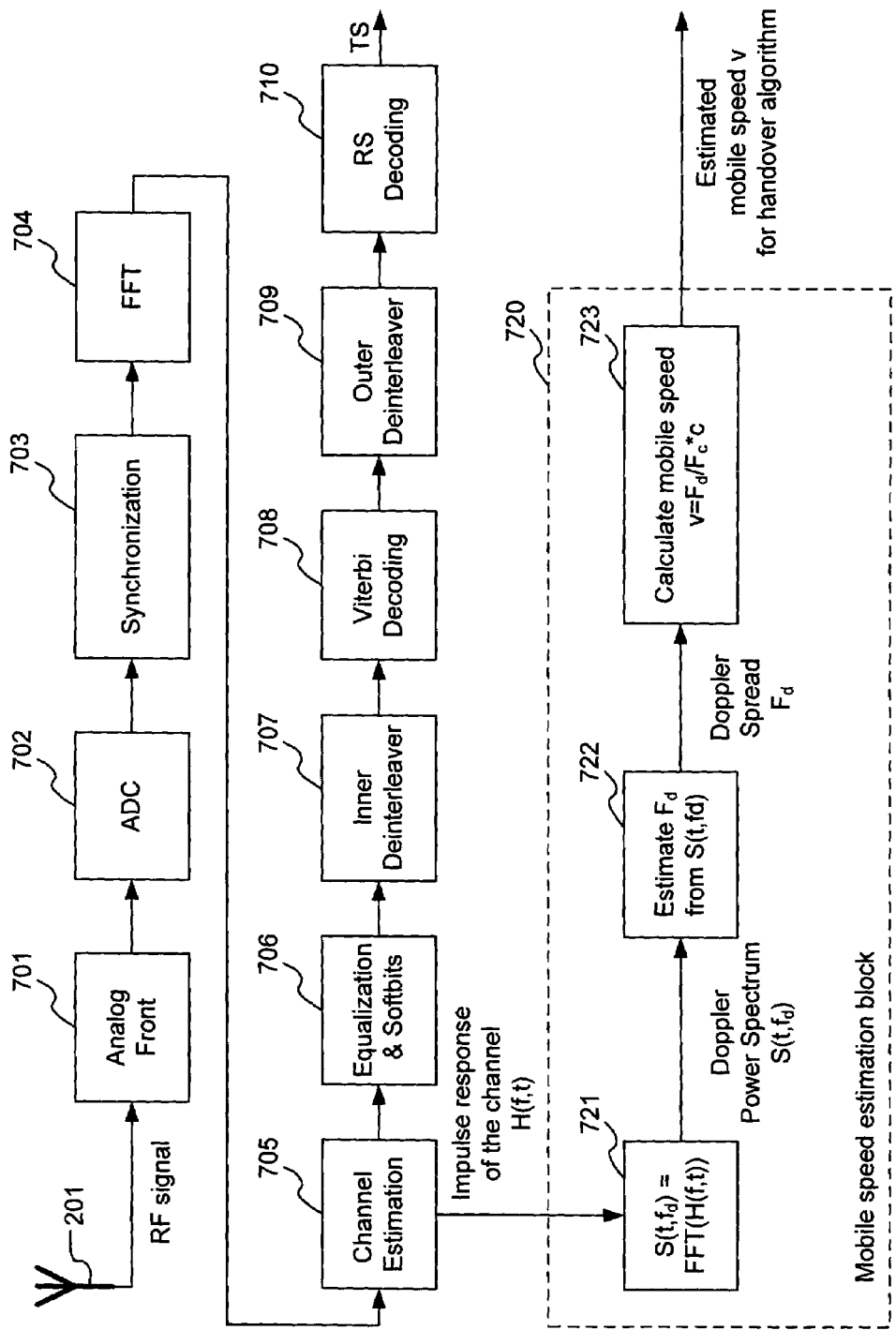
FIG. 7 depicts a functional block diagram of a digital broadband broadcast receiver as may be found in a mobile terminal according to one or more illustrative embodiments of the invention.

FIG. 7 depicts a functional block diagram of a digital broadband broadcast receiver as may be found in mobile terminal 101 according to one or more illustrative embodiments of the invention. Although one design is provided here, those of skill in the art will understand that many other receiver designs are available which may alternatively be used to implement the invention. Moreover, the functional components depicted in FIG. 7 may or may not be exclusively implemented within a receiver. Individual functional blocks in FIG. 7 may either be implemented in electronic hardware or programmed in software. Various functional components described may be configured to execute within processor 204, for example, or may otherwise be combined according to design criteria.

Here, an analog RF signal is received by antenna 201 and run through analog front 701. Block ADC 702 converts the signal from analog to digital for further processing. In synchronization block 703, the digital signal may undergo time and frequency synchronization, and may also have any guard interval removed. At block 704, the digital signal is run through a Fast Fourier Transform (FFT), and the result undergoes channel estimation 705 and channel equalization and soft-bit generation 706. Functional blocks 707 through 710 then perform a series of decoding steps including inner deinterleaving 707, Viterbi decoding 708, outer deinterleaving 709, and finally Reed-Solomon decoding 710. In the case of a DVB-H signal, the output of Reed-Solomon decoding is a transport stream carrying digital content which may include program specific information, service information, audio, video, data, and so forth. It should be noted that among the places that a bit error ratio (BER) may be determined is either immediately preceding or following Viterbi decoding 708.

Turning to the mobile speed estimation block 720 of FIG. 7, one method for calculating the speed of mobile terminal 101 with respect to transmitter 116 is presented. In block 721, the channel impulse response H(f,t) of the signal from channel estimation block 705 runs through a FFT to produce Doppler power spectrum $S(t,f_d)$. At block 722, the Doppler power spectrum is used to estimate the Doppler spread $F_d$. The Doppler spread frequency is then used to estimate mobile speed using equation (1):

$$v = \frac{F_d}{F_c} * c \tag{1}$$

The resulting speed approximates the speed of mobile terminal 101 with respect to transmitter 116. The value may be used in calculating the dynamic handover measurement interval described above.

Figure 8:
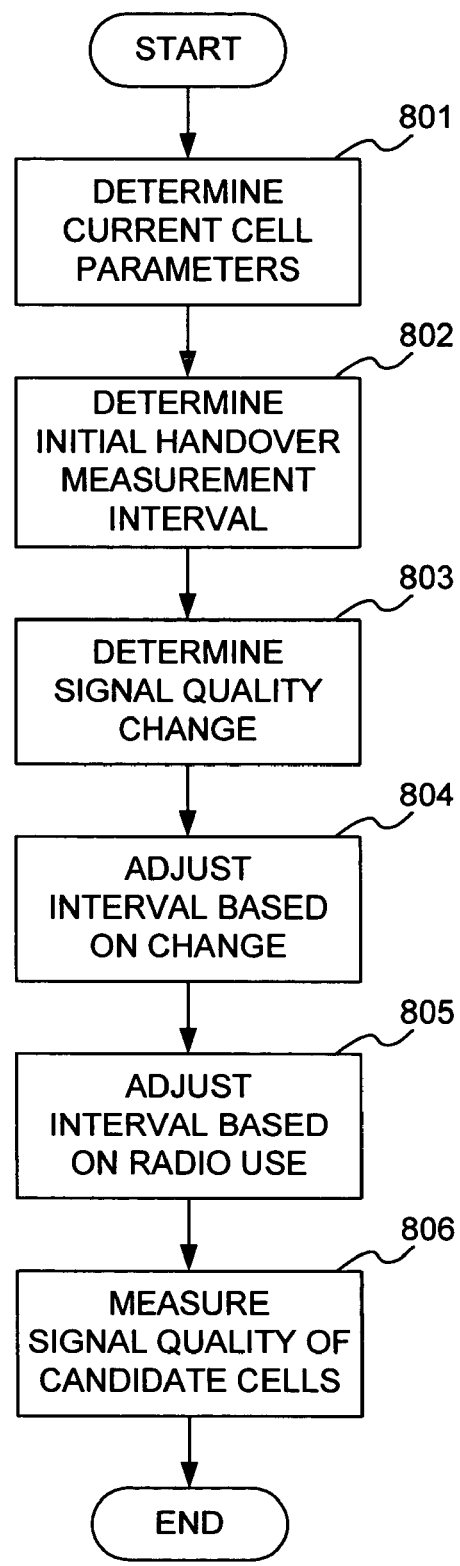
FIG. 8 is a flowchart depicting a method for calculating a handover measurement interval according to one or more illustrative embodiments of the invention.

FIG. 8 is a flowchart depicting a method for calculating a handover measurement interval according to one or more illustrative embodiments of the invention. At initial step 801, parameters which may affect the handover measurement interval calculation for the current cell are determined. This may include measuring, calculating, or otherwise receiving data including cell size, carrier frequency, modulation, guard interval, code rate, maximum receiver speed, and so forth. Once parameters are determined, at step 802 an initial handover measurement interval is determined using the parameter information. As a receiver moves through the current cell, changes in signal quality are detected at step 803, either by measuring the radio signal strength, bit error ratio, and/or the packet error ratio. At step 804, the determined signal quality information is used to adjust the handover measurement interval. This may mean that in the case of increasing signal quality, the interval is lengthened, and in the case of decreasing signal quality, the interval is shortened. At step 805, the determined handover measurement interval may be further adjusted so that it is timed to coincide with the radio being in use. In this manner, a receiver will not have to waste power by shutting down and powering up again just to perform a handover measurement. Finally, at step 806, the next handover measurement is taken after the handover measurement interval has elapsed.

While aspects of the invention have been described with respect to specific examples, including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method comprising:
   determining cell parameters for a current cell, wherein the current cell broadcasts a broadband digital signal;
   determining a handover measurement interval based on the cell parameters;
   determining that a signal is scheduled to be received at a predetermined time;
   adjusting the handover measurement interval so that a handover measurement is scheduled to coincide with the predetermined time; and
   measuring a signal quality of one or more candidate cells at a time varying based on the handover measurement interval.

2. The method of claim 1, further comprising:
   receiving the broadband digital signal from the current cell;
   determining a rate of signal quality change over time for the current cell; and
   adjusting the handover measurement interval based on the rate of signal quality change.

3. The method of claim 2, wherein the rate of signal quality change over time is determined at least in part by calculating a rate of signal strength change.

4. The method of claim 2, wherein the rate of signal quality change over time is determined at least in part by calculating a rate of change for one of a bit error ratio and a packet error ratio.

5. The method of claim 1, further comprising:
   determining a receiver speed relative to a cell transmission station; and
   adjusting the handover measurement interval based on the receiver speed.

6. The method of claim 5, wherein the receiver speed relative to a cell transmission station is determined in part by measuring the Doppler shift of signals received from the cell transmission station.

7. The method of claim 1, wherein the cell parameters comprise a size of the current cell.

8. The method of claim 1, wherein a previously received signal indicates the predetermined time.

9. An apparatus comprising:
   a receiver configured to receive a digital broadband broadcast signal from a transmitter in a current cell;
   a processor configured to:
   determine parameters for the current cell;
   determine a handover measurement interval based on the current cell parameters;
   determine that a signal is scheduled to be received at a predetermined time;
   adjust the handover measurement interval so that a handover measurement is scheduled to coincide with the predetermined time; and
   schedule a handover measurement at a time based on the handover measurement interval.

10. The apparatus of claim 9, further comprising:
    a memory, and
    wherein the processor is further configured to:
    store signal quality information for the current cell in the memory; and
    calculate an adjustment to the handover measurement interval based on the stored signal quality information for the current cell.

11. The apparatus of claim 10, wherein the signal quality information comprises signal strength measurements over time.

12. The apparatus of claim 10, wherein the signal quality information comprises one of a bit error ratio and a packet error ratio calculated over time.

13. The apparatus of claim 9, wherein the processor is further configured to:
    determine a speed of the apparatus relative to the transmitter; and
    calculate an adjustment to the handover measurement interval based on the apparatus speed.

14. The apparatus of claim 13, wherein the speed of the apparatus is determined by estimating the Doppler shift of a carrier frequency caused by movement of the apparatus.

15. The apparatus of claim 9, wherein current cell parameters are determined by receiving the parameters via the digital broadband broadcast signal.

16. The apparatus of claim 15, wherein the current cell parameters comprise a cell size.

17. The apparatus of claim 9, wherein a previously received digital broadband broadcast signal at the receiver indicates the predetermined time.

18. An apparatus comprising:
    a receiver configured to receive digital broadband broadcast burst signals from a transmitter in a cell;
    a memory configured to store information relevant to the cell; and
    a processor, configured to:
    determine a size of the cell;
    retrieve signal quality measurements from the receiver;
    store signal quality measurements in the memory;
    determine a handover measurement interval based on the size of the cell;
    adjust the handover measurement interval based on the signal quality measurements stored in the memory; and
    schedule handover measurements at a time based on the handover measurement interval.

19. The apparatus of claim 18, wherein the processor is configured to determine the size of the current cell by:
    receiving longitude and latitude information about the cell via the receiver from the digital broadband broadcast burst signals; and
    calculating a size of the cell based on the longitude and latitude information.

20. The apparatus of claim 18, further comprising:
    a positioning system, wherein the processor is further configured to:
    receive a location of the apparatus from the positioning system;
    calculate a speed and a direction of the apparatus based on changes in the location; and
    adjust the handover measurement interval based on the calculated speed and direction of the apparatus.

21. An apparatus, comprising:
circuitry configured to perform the following:
determining a speed of the apparatus moving through a current cell by performing the following:
    receiving a channel impulse response of a Doppler shifted signal;
    performing a Fast Fourier Transform on the channel impulse response to produce a Doppler power spectrum;
    estimating a Doppler spread frequency based on the Doppler power spectrum; and
    calculating the speed of the apparatus by dividing the Doppler spread frequency by a carrier frequency and multiplying the resulting ratio by the speed of light; and
determining at least a portion of a handover measurement interval based on the speed of the apparatus.

22. The apparatus of claim 21, wherein the circuitry is further configured to determine at least a portion of the handover measurement interval based on a predetermined time at which a signal is scheduled to be received.

23. The apparatus of claim 22, wherein the circuitry is further configured to use the portions of the handover measurement interval to schedule a handover measurement to occur at a time to coincide with the predetermined time.

24. One or more computer readable media storing computer code that, when executed, cause a computer to perform a method comprising:
determining parameters for a current cell;
determining a handover measurement interval based on the parameters;
determining that a signal is scheduled to be received at a predetermined time;
adjusting the handover measurement interval so that a handover measurement is scheduled to coincide with the predetermined time; and
measuring the signal quality of one or more candidate cells at a time varying based on the handover measurement interval.

25. The computer readable media of claim 24, storing further computer code, that when executed, cause the computer to:
perform the adjusting by scheduling a handover measurement to coincide with the predetermined time by occurring at a time immediately after the predetermined time.

26. The computer readable media of claim 24, storing further computer code, that when executed, cause the computer to: ,
receive a digital broadband broadcast burst at the predetermined time, followed by performing the handover measurement.

27. The computer readable media of claim 24, storing further computer code, that when executed, cause the computer to:
determine a Doppler shift of signals received from a cell transmission station; and
calculate a speed relative to the cell transmission station based on the Doppler shift.

* * * * *